United States Patent [19]
Suarez et al.

[11] Patent Number: 6,128,346
[45] Date of Patent: Oct. 3, 2000

[54] METHOD AND APPARATUS FOR QUANTIZING A SIGNAL IN A DIGITAL SYSTEM

[75] Inventors: Jose' I. Suarez, Coral Gables; Yolanda Prieto, Miami, both of Fla.

[73] Assignee: Motorola, Inc., Schaumburg, Ill.

[21] Appl. No.: 09/059,823

[22] Filed: Apr. 14, 1998

[51] Int. Cl.[7] .............................. H04B 1/10; H04B 14/04
[52] U.S. Cl. ......................... 375/254; 375/243; 371/77; 371/143
[58] Field of Search .................................. 375/242, 243, 375/245, 254; 341/77, 143

[56] References Cited

U.S. PATENT DOCUMENTS

| | | | |
|---|---|---|---|
| 5,455,874 | 10/1995 | Ormsby et al. | 382/251 |
| 5,675,701 | 10/1997 | Kleijn et al. | 395/2.31 |
| 5,802,481 | 9/1998 | Prieto | 702/190 |
| 5,881,183 | 3/1999 | Lee | 382/288 |

OTHER PUBLICATIONS

Zheng et al. "Design of Vector Quantization Codebooks Using a Genetic Algorithm" IEEE International Conf. on Evolutionary Computation, Jan. 1997.

Kong et al., "Diffential Competitive Learning for Centroid Estimation and Phoneme Recogniation" IEEE Transactions on Neural Networks, vol. 2, No. 1, Jan. 1991.

Caglar, Hakan, "A Generalized, Parametric PR–QMF/ Wavelet Transform Design Approach for Multiresolution Signal Decomposition," UMI Dissertation Services, 1995.

*IEEE* Transactions on Image Processing, Jul. 1996.

Strintzis, M.G., "Optimal Selection of Multi–Dimensional Biothogonal Wavelet Bases," *IEEE* 1994.

Chen, W., Smith, C.H., Fralick, S.C., "A Fast Computational Algorithm for the Discrete Cosine Transform," IEEE 1977.

Van Dyck, R.E., Moayeri N., Marshall T.G., and Chin M., "Video Coding using Entropy–Constrained Trellis Coded Quantization," Proceedings of the SPIE vol. 2298, pp. 119–30, 1995.

Gharvai, H., "Sub–Band Coding of Monochrome and Color Images," Transactions on Circuits and Systems, IEEE 1988.

Ahmed N., Natarajan T., and Rao, K.R., "Discrete Cosine Transform," The Institute of Electrical and Electronics Engineers, Inc., IEEE Comput.Trans. 1974.

Huh Y., Hwang J.J., and Rao, K.R., "Block Wavelet Transfer Coding of Images using Classified Vector Quantization," IEEE Transactions on Circuits and System, vol. 5, No. 1, Feb. 1995.

Nasrabadi, N.M. and King R.A., "Image Coding using Vector Quantization: A Review," IEEE Transactions on Communications, vol. 36, No. 8, Aug. 1988.

Versvik I. and Guren, H.C. "Subband Coding with Vector Quantization," IEEE 1986.

"Scalar Quantization" Chapter 8, pp. 289–354.

Soman A.K. and Viadyanathan P.P. "Paraunitary Filter Banks and Wavelet Packets," Department of Electrical Engineering, Cal. Tech., IEEE 1992.

Fowler, Jr. J., Adkins, K.C., Bibyk S.B., and Ahalt S.C. "Real–Time Video Compression using Differential Vector Quantization," *IEEE* 1995.

(List continued on next page.)

*Primary Examiner*—Chi H. Pham
*Assistant Examiner*—Bryan Webster
*Attorney, Agent, or Firm*—Barbara R. Doutre

[57] ABSTRACT

An input data signal (102) in a digital signal processing system gets adaptively quantized by performing a LMS error algorithm on a signal of transformed coefficients (113), determining paths of minimum error (202), and forming a three-dimensional matrix (206) representing these paths. Centroids are computed (208) based on the paths of minimum error (206), and these computed centroids are used as part of a next iteration to represent new quantization states and levels.

36 Claims, 7 Drawing Sheets

OTHER PUBLICATIONS

Chan P. and Lim J.S. "One–Dimensional Processing for Adaptive lage Restoration," *IEEE* 1985.

Abramatic JF and Silverman L.M. "Nonlinear Restoration of Noisy Images," *IEEE* 1982.

Andrew J.P., Ogunbona P.O. and Paoloni F.J., university of Woolongong, NSW, Australia, "Coding Gain and Spatial Localisation Properties of Discrete Wavelet Transform Filters for Image Coding," *IEEE* 1995.

Onno P. And Guillemot C. "Tradeoffs in the Design of Wavelet Filters for Image Compression," Process of the SPIE International Society for Optical Engineers, vol. 2094, Pt., 3, pp. 1536–47, 1993.

Makhoul J., Roucos S., and Gish H. "Vector Quantization in Speech Coding," BBN Labs, Inc., Cambridge, MA, *IEEE* 1985.

"Wavelets: An Elementary Treatment of Theory and Applications," Series in Approximations and Decompositions—vol. 1, edited by Koornwinder T.H., World Scientific Publishing Co. Pte. Ltd., London, England, 1993.

Anderson G.L. and Netravali A.N., "Image Restoration Based on a Subjective Criterion," Bell Labs, New Jersey, IEEE Transactions on Systems, Man, and Cybernetics, vol. SMC–6, No. 12, Dec. 1976.

Sajadieh M. and Venetsanopoulos A.N., "Wavelet Vector Quantization of Images," Department of Electrical Engineering, University of Toronto, Toronto, Ont., Canada, IEEE 1992.

Westerink P.H. "Subband Coding of Images," Oct. 1998.

Averbuch A., Lazar D., and Israeli M., "Image Compression using Wavelet Transfor and Multiresolution Decomposition," *IEEE* 1996.

Kovacevic J., "Subband Coding Systems Incorporating Quantizer Models," Signal Processing Research Dept., AT&T Bell Labs., Murray Hill, New Jersey, *IEEE* 1995.

Parthasarathy, S. and Marcellin, M.W., "Image Coding Using Wavelet Transforms and Entropy–Constrained Trellis–Coded Quantization," *IEEE* Transactions on Image Processing, vol. 4, No. 6, Jun. 1995.

METHOD AND APPARATUS FOR QUANTIZING A SIGNAL IN A DIGITAL SYSTEM

CROSS REFERENCE TO RELATED APPLICATIONS

This application is related to U.S. application Ser. No. 08/822,403 filed Mar. 20, 1997, by Yolanda Prieto, entitled "Adaptive Filtering For Use With Data Compression and Signal Reconstruction," and U.S. application Ser. No. 08/822,404 filed Mar. 20, 1997, by Yolanda Prieto, entitled "Data Compression System, Method, and Apparatus," previously filed and assigned to Motorola, Inc.

TECHNICAL FIELD

This invention relates in general to data compression and particularly to digital data compression. Specifically, the invention relates to a method and apparatus that provides improved quantization in systems utilizing a trellis coded quantizer.

BACKGROUND

With the advent of technologies and services related to teleconferencing and digital image storage, considerable progress has been made in the field of digital signal processing. As will be appreciated by those skilled in the art, digital signal processing typically relates to systems, devices, and methodologies for generating a sampled data signal, compressing the signal for storage and/or transmission, and thereafter reconstructing the original data from the compressed signal. Critical to any highly efficient, cost effective digital signal processing system is the methodology used for achieving compression.

As is known in the art, data compression refers to the steps performed to map an original data signal into a bit stream suitable for communication over a channel or storage in a suitable medium. Methodologies capable of minimizing the amount of information necessary to represent and recover an original data are desirable in order to lower computational complexity and cost. In addition to cost, simplicity of hardware and software implementations capable of providing high quality data reproduction with minimal delay are likewise desirable.

Quantization refers to the technique of taking a bit stream of data and compressing it for later reproduction. There are several algorithms that may be used to achieve compression of a data signal. The most elementary methods take signal samples and quantize each signal sample into one of a small number of levels. A well-known quantizer is the Lloyd-Max optimal quantizer using nearest neighbor, minimum squared error (MSE) rules to classify an input into a specified number of levels.

Quantization can be achieved through a variety of other approaches including vector, scalar, rounding, truncation, and trellis coded quantization (TCQ) among other methods. Vector quantization is considered an efficient means of quantization, because it takes a group of samples and represents that group by only one symbol thus yielding improved compression and generating a high signal-to-noise (SNR). However, vector quantization is computationally intensive and requires a look-up table (i.e. needs memory). Scalar quantization represents one sample per symbol and is less computationally extensive than vector quantization. However, scalar quantization has the disadvantage of lower compression rate. An alternative to quantization is the rounding off or truncating of the output signal but this may lead to resolution problems.

To present, the next standard of JPEG 2000 (Joint Photographic Experts Group) systems for still images proposes algorithms which use a wavelet to achieve decomposition of an input signal and a trellis coded quantizer for signal compression.

Trellis coded quantization is based on a Viterbi algorithm which provides a search to generate a minimum error path. Generally, the Viterbi works in conjunction with a lattice quantizer (uniform grid). While the lattice quantization operation is computationally effective, the result is not optimal for distortion. At high compression rates (low bits/sample) the SNR degrades. Hence, there remains a need for an improved TCQ technique and apparatus that operates to reduce the noise generated during data signal compression (quantization noise), and improve the achievable signal to noise ratio (quality) during data reconstruction.

Accordingly, there is a need for an improved trellis coded quantization (TCQ) technique particularly as applied to digital signal processing systems.

DETAILED DESCRIPTION OF THE PREFERRED EMBODIMENT

Figure 1:
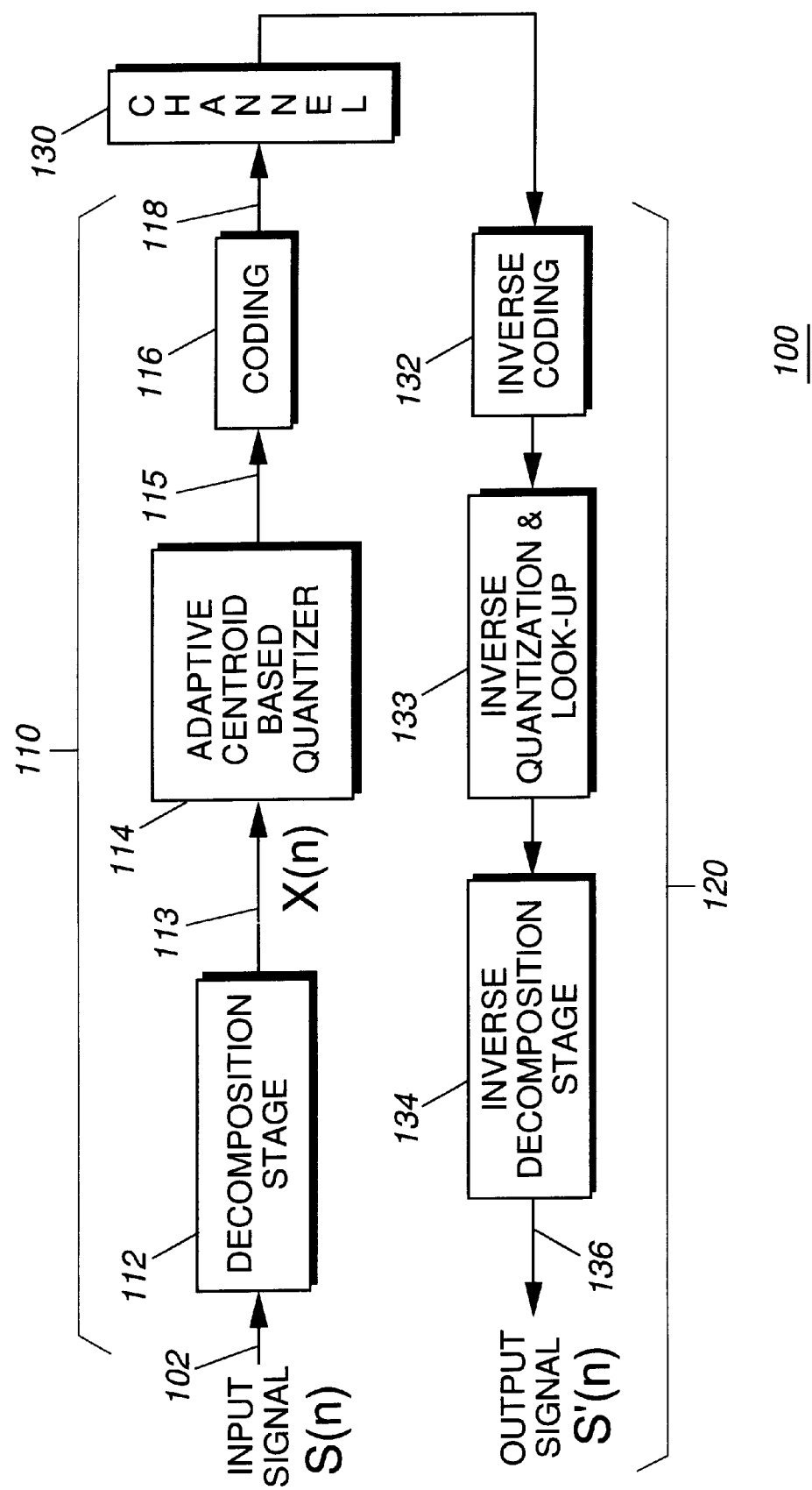
FIG. 1 is a block diagram of a data CODEC in accordance with the preferred embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention to be described herein improves the quantization step which can be implemented as part of a data CODEC. Referring now to FIG. 1, there is shown a data CODEC block diagram 100 in accordance with the present invention. This data CODEC 100 can be applied to three-dimensional (3-D) systems, such as video, two-dimensional (2-D) systems, such as still images, as well as one-dimensional (1-D) systems, such as speech.

Data CODEC 100 includes an encoder 110 and a decoder 120. Briefly, an input data signal S(n) 102, having a predetermined bit/sample resolution, goes through a transformation at decomposition stage 112. The transformed signal x(n) 113 then goes through a quantization stage 114 for further compression in accordance with the present invention. In accordance with the present invention, the quantization stage 114 provides a centroid based quantization to generate non-uniform spaced quantizers. The quantized signal 115 is then coded through coding stage 116 preferably using one of a variety of well known coding schemes. A coded signal 118 is then communicated over or stored to channel 130. At the receiving end, decoder 120 employs an inverse coding stage 132, inverse quantization stage 133, and an inverse decomposition stage 134 to recreate the input data signal S(n) as output data signal S'(n) 136.

The decomposition stage 112 is basically a frequency domain analyzer which performs data conversion through one of a variety of well known methods such as wavelet, FFT (Fast Fourier Transform), DCT (Discrete Cosine Transform), DFT (Discrete Fourier Transform), DST (Discrete Sine Transform) KLT (Karhunen-Loewe Transform), WHT (Walsh-Hadamard Transform). The transformation used here falls under what is called subband coding. In subband coding, whether 1-D, 2-D, or 3-D the input data signal 102 is repeatedly divided through a filter bank of low pass and high pass filters to produce an output of subband selected coefficients of the original signal. The transformed signal x(n) 113 will thus also be referred to as a signal of transformed coefficients. In the preferred embodiment of the invention, decomposition stage 112 may comprise a wavelet such as that proposed in the next standards for JPEG 2000 systems. The wavelet helps achieve certain multi-resolutional capabilities and minimizes blocking effects in the case of image data.

Coding stage 116 and inverse coding stage 132 can operate through a variety of coding schemes including but not limited to arithmetic, Huffman, or other well known coding and decoding schemes.

Channel 130 may include a wireless, wireline, acoustic, or optically linked path such as, for example, a radio frequency (RF) or fiber optic transmission path. The channel 130 may likewise be a storage medium such as those now known or later developed.

Inverse quantization stage 133 can operate through a variety of inverse quantization schemes including but not limited to trellis coded quantization, scalar, vector, or even an inverse version of the adaptive centroid based quantizer 114. Inverse decomposition stage 134 is preferably controlled by well known means such as inverse wavelet transformation or by a set of filter banks.

Figure 2:
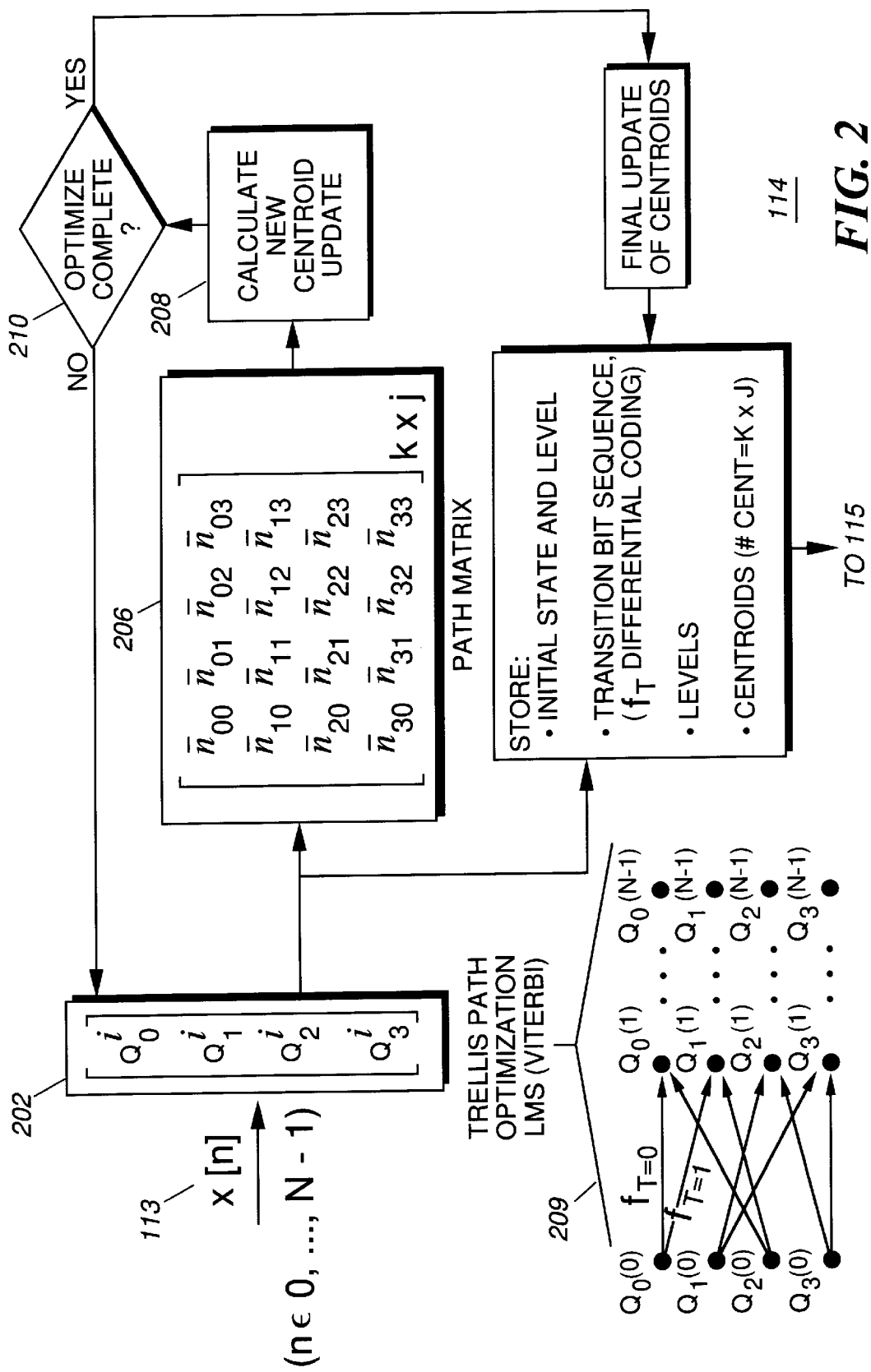
FIG. 2 is an adaptive centroid based quantizer in accordance with the present invention.

In accordance with the present invention, the quantization stage 114 is a centroid-base quantizer which takes an entire range of coefficients (which represent all or some of the subbands) and generates optimal non-uniform allocation of the quantizer levels within the states. Referring now to FIG. 2, there is shown a block diagram of a four state trellis coded quantizing (TCQ) stage 114 in accordance with the preferred embodiment invention. Briefly, in accordance with the invention, a trellis path optimization 202 is performed on transformed coefficients signal x(n) 113 to generate an output configured as a path matrix 206 upon which a centroid computation is performed at stage 208. The centroids are then fed back to the trellis path optimization stage 202 to be used as the new adaptive centers for the quantizer levels for another iteration and generation of path matrix and updated centroid computation. The path matrix 206 is formed of vector elements "$n_{k,j}$", where k represents the quantization state from a total set of K states, and j represents the level from a total set of J levels per state. In accordance with the present invention, the steps of trellis path optimization 202, path matrix configuration 206, and centroid updating 208 are adaptively reiterated until an acceptable SNR, or other desired error measurement, entropy or bit rate is achieved 210.

In accordance with the present invention, the trellis path optimization 202 is preferably achieved through a "least mean square" (LMS) algorithm for selecting transitions from quantizer to quantizer to obtain the path yielding a minimum error. However, other optimization schemes can also be used, such as a mini-max, to yield minimum error paths.

An example of a basic implementation of path optimization 202 is shown in a preferred embodiment 209 where for a set of K quantizers referred to as states, each having J levels, the quantizers (states and levels) cover an entire range of input data. The states and levels may be obtained from a larger quantizer after splitting it into sub-sets that may initially be uniformly distributed. The quantization levels of each state define the quantization intervals by the mid-points, or centroids, between the levels.

In the course of finding the best level and state corresponding to an input data sample, optimization entails finding the best sequence of states and levels as the data samples are inputted to minimize a distortion, error measurement, entropy, or bit rate, 210. The trellis is optimized for a particular data set or sets, actually making it an adaptive quantizer with several states, each of which is in a particularly smaller and optimized quantizer. There is a match between the state sequence and a particular data sequence. If, after optimization a different data set is inputted, even with the same probability density function (pdf) or histogram, most of the distortion reduction could disappear and a new optimization may be performed, thus resulting in an adaptive procedure. For a trellis quantizer of K states, select only one of the available J levels for each incoming data sample Thus, if M represents the global number of quantization steps to each state in the trellis, M/K levels may be assigned. The first state and level for the first input data sample may be determined independently by finding the state that yields the lowest error. Subsequently, each incoming input value can only be assigned to one of $2^f$ states of all K states following a transition table, such as the table 209 shown in FIG. 2. Therefore, it takes "f" bits to tell a decoder what transition path to follow. For example, as shown in 209, with f=1, from Qo, the next sample input can be quantized by either Qo (or Q1) and in addition, certain bits to tell the decoder which level to use. The four-state trellis path optimization 209 or any other K state trellis can also be implemented in another configuration that is basically its mirror image.

For the purposes of example, an LMS algorithm known as the Viterbi algorithm will be the minimum error algorithm described. The Viterbi algorithm takes a whole range of data, say x(n) 113 where n can be 0 to N−1, and quantizes this data as part of a first iteration, to allow data to be allocated to the different levels for each state. Whatever data falls between the quantizers will be allocated to the nearest level.

The Viterbi algorithm is a "least mean square" (LMS) way of finding the minimum error for all the different paths between the quantizers. The Viterbi algorithm optimizes the path through the trellis, path $\Pi^i(Q^i)$ at the i-th iteration with quantizer set $\{Q^i\}$, following the allowable transitions. For example, while referring to the Viterbi shown in FIG. 2, the sample x(n) at t=0 is quantized to $Q_0(0)$, then at t=1 the transition can only go to either $Q_0(1)$ or $Q_1(1)$. At the end of the LMS algorithm, the history of the path taken to yield minimum error is succinctly extracted and represented in the form of a three dimensional path matrix 206.

From the path matrix 206, the centroids are calculated at stage 208 which is then used to represent the data samples which fell within a particular quantization state and level. The centroid calculation is based on an average determined by the following equation:

$$C_{k,j}^{i+1} = \frac{1}{length\,(\bar{n}_{k,j})} \sum x(\bar{n}_{k,j}(m)), \text{ mean} \quad (1)$$

$$m = 1:length\,(\bar{n}_{k,j})$$

where $\bar{n}_{k,j}$ denotes vector and if $\bar{n}_{k,j}$ is empty, then $$C_{k,j}^{i+1} = C_{k,j}^{i} \quad \text{(no update)} \quad (2)$$

The newly computed and updated, centroids $C_{k,j}^{(i+1)}$ are then fed back to the trellis path optimization stage 202 where they are used as the new centers for the j-th level of the k-th state, for the start of the next (i+1)-th iteration This is represented by the feedback arrow in FIG. 2.

As an example consider a string of input data for x(n) 304 consisting of ten samples where:

input data = x(n) = [10.0, 10.2, 0.5, 2.18, 1.9, 13.75, 10.40, 0.1, 11.2, 2.5]

in other words, where x(0) = 10.0 x(1) = 10.2 x(3) = 0.5

⋮ x(9) = 2.5 and where [0, 1, 2, 3, . . . 9] each represent an index that points to specific data sample value. (Note that the actual values of data samples are the transformed coefficients x(n).)

Next, the transformed coefficients input x(n) 113 is quantized using trellis 202. In this example, trellis 202 is configured to have four states [Q0, Q1, Q2, Q3] with each state having four levels (therefore there are sixteen quantization steps and sixteen centroids to be computed). Though shown and described in terms of a four state four level trellis, one skilled in the art appreciates, that trellis 202 can be formed in a variety of configurations having two or more states, each state having several levels. Typically, however, trellis quantizers utilize four states, the simplest case.

Again, the four states of trellis 202 are quantizers Q0, Q1, Q2, Q3 and each state has been assigned four levels. For the first iteration it will be assumed that a Viterbi algorithm is used to obtain the least mean square error yielding path in the quantizer assignment, however other LMS algorithms could also be utilized. For the first iteration, a uniform distribution of the levels is used, however, one skilled in the art also appreciates that the first iteration could also be performed using a non-uniform distribution of the levels as well. For instance, in the case of an initial quantizer allocation that uses the distribution of the input data to best assign quantization states and levels, a non-uniform distribution of levels may be more suitable. For example, for an input sample range which has a Laplacian type distribution (i.e. sharply peaked, zero-mean distribution), a shrink factor can be applied to quantization steps to achieve a non-uniform distribution of levels.

Figure 3:
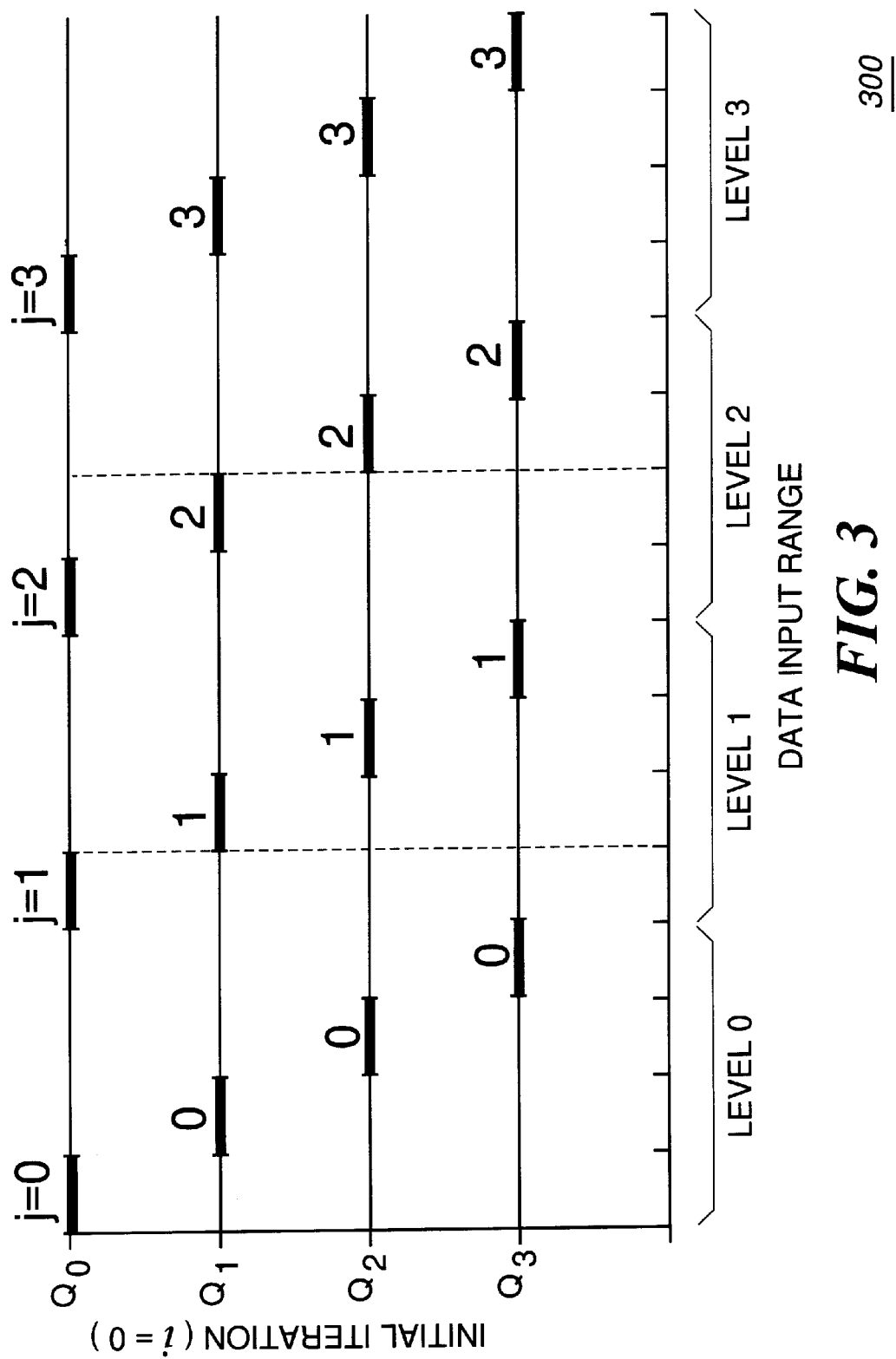
FIG. 3 a graphical representation of an example of the level distribution for each of the four quantizer states going through the first iteration of i=0 for the quantizer of FIG. 2 in accordance with the present invention.

Referring now to FIG. 3, there is shown a graphical representation of the level distribution for each of the four quantizer states going through the first iteration of i=0. Graph 300 represents a possible example of the first iteration of quantizer states Q0, Q1, Q2, Q3 versus the four levels of data input ranges divided into sixteen quantization steps.

The following table shows various ranges of input data and the allocation of quantizers states and levels for that given range (where "[" is inclusive and ")" is exclusive).

| | | | | |
|---|---|---|---|---|
| 0 ---> 1, | [0, 1) | ==> | Q0 | level 0 |
| 1 ---> 2, | [1, 2) | ==> | Q1 | level 0 |
| 2 ---> 3, | [2, 3) | ==> | Q2 | level 0 |
| . | | | | |
| . | | | | |
| 14 ---> 15, | [14, 15) | ==> | Q2 | level 3 |
| 15 ---> 16, | [15, 16) | ==> | Q3 | level 3 |

Referring back to the Viterbi trellis of FIG. 2, the trellis takes a sample $x(n_i)$ and if the sample was quantized to any of four levels of state Q0 (or Q2) at time $t=t_i$, then the next sample $x(n_i+1)$ at time $t=t_i+1$ can only be quantized to any of the four levels of state Q0 or Q1. Similarly, if sample $x(n_i)$ was quantized to any of four levels of state Q1 (or Q3) at $t=t_i$, then the next sample $x(n_i+1)$ at time $t=t_i+1$ can only be quantized to any of the four levels of states Q2 or Q3.

So, for the input data x(n) given above, the data gets quantized through LMS stage 202 based not only on the value of the sampled data but also on the previous quantizer state. A path matrix 206 is then configured by storing the indexes pointing to the input data into the various matrix locations of $n_{(state,\,level)}$. The following table shows how the sampled data gets quantized and the indexes are assigned to the matrix locations.

| | | location of index |
|---|---|---|
| x(index) = data, | quantizer state #/ level and | stored in matrix |
| x(0) = 10.0 | gets quantized by Q2 level 2 ==> | $n_{22} = [0, \ldots ]$ |
| now x(1) can only be quantized with any four levels of either Q0 or Q1 | | |
| (quantizer Q1 level 2 gives the lowest error) | | |
| x(1) = 10.2 | gets quantized by Q1 level 2 ==> | $n_{12} = [1 \ldots ]$ |
| now x(2) can only be quantized with either Q2 or Q3 | | |
| x(2) = 0.5 | gets quantized by Q2 level 0 ==> | $n_{20} = [2, \ldots ]$ |
| now x(3) can only be quantized with Q1 or Q0 | | |
| x(3) = 2.18 | gets quantized by Q1 level 0 ==> | $n_{10} = [3, \ldots ]$ |
| now x(4) can only be quantized with Q2 or Q3 | | |
| x(4) = 1.9 | gets quantized by Q2 level 0 ==> | $n_{20} = [2,4, \ldots ]$ |
| now x(5) can only be quantized with Q0 or Q1 | | |
| x(5) = 13.75 | gets quantized by Q1 level 3 ==> | $n_{13} = [5, \ldots ]$ |
| now x(6) can only be quantized with Q2 or Q3 | | |
| x(6) = 10.4 | gets quantized by Q2 level 2 ==> | $n_{22} = [0,6 \ldots ]$ |
| now x(7) can only be quantized with Q0 or Q1 | | |
| x(7) = 0.1 | gets quantized by Q0 level 0 ==> | $n_{00} = [7 \ldots ]$ |
| now x(8) can only be quantized with Q0 or Q1 | | |
| x(8) = 11.2 | gets quantized by Q0 level 3 ==> | $n_{03} = [8, \ldots ]$ |
| now x(9) can only be quantized with Q0 or Q1 | | |
| x(9) = 2.5 | gets quantized by Q1 level 0 ==> | $n_{10} = [3,9, \ldots ]$ |

The indexes stored in each matrix location represent the LMS (least mean square) of the original data (i.e. the path of minimum error). So, continuing through the first iteration (which in this example started with a uniform distribution), the matrix 206 is formed of the following stored indexes:

| | |
|---|---|
| $n_{00}$ = [7] | $n_{20}$ = [2,4] |
| $n_{01}$ = empty | $n_{21}$ = empty |
| $n_{02}$ = empty | $n_{22}$ = [0,6] |
| $n_{03}$ = [8] | $n_{23}$ = empty |
| $n_{10}$ = [3,9] | $n_{30}$ = empty |
| $n_{11}$ = empty | $n_{31}$ = empty |
| $n_{12}$ = [1] | $n_{32}$ = empty |
| $n_{13}$ = [5] | $n_{33}$ = empty |

Figure 4:
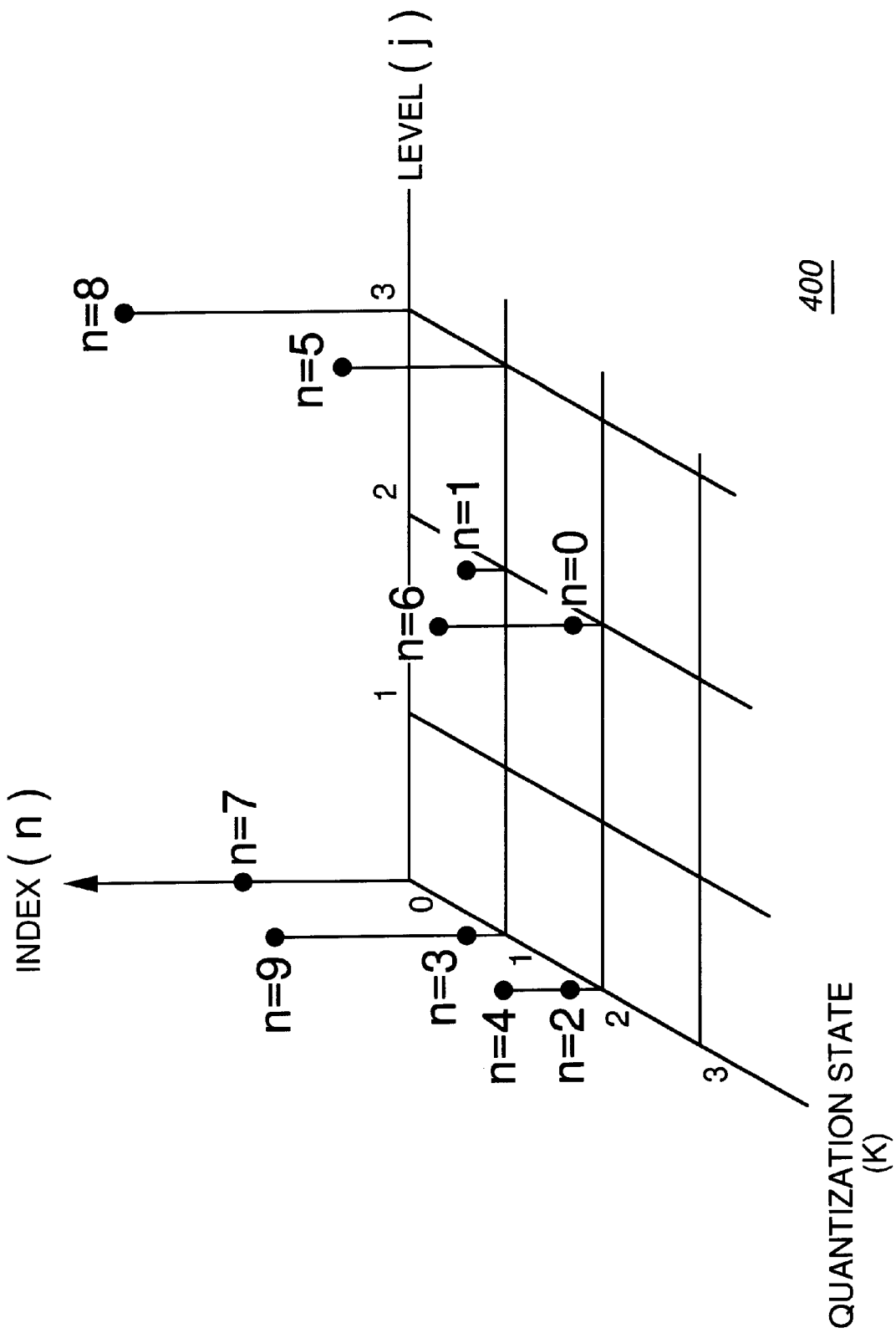
FIG. 4 is an example of a pictorial representation of stored indexes from the first iteration for the quantizer of FIG. 2 in accordance with the present invention.

A pictorial representation of the stored indexes is shown in FIG. 4 to help illustrate that the path matrix 206 actually represents a 3-D configuration 400 of quantizer state, level, and index. Each input data point is represented by an index denoting the position in time at which the sample input point occurs. In the path matrix 206 of FIG. 2, each element $\bar{n}_{k,j}$ consists of a vector whose elements are the indices of the particular input data samples that were quantized to state k, level j. In the case where no input sample was quantized to state k, level j, this matrix element $\bar{n}_{k,j}$ would be empty.

Continuing through the first iteration of i=0, the next step is to calculate the centroids. As shown in equations(1), (2) above, the calculation of the centroid is based on an average. Thus, the centroid computations for the first iteration (t=i) of this example produce:

$$\text{for } n_{00} \to c_{00} = x[7] = 0.1$$

and, $c_{01}$=remains as previously set
$c_{02}$=remains as previously set $$\text{for } n_{03} \to c_{03} = x[8] = 11.2$$

and $$\text{for } n_{10} \to c_{10} = \frac{1}{2}[x(3)+x(9)] = \frac{1}{2}(2.18+2.5) = 2.34$$

(note that prior to this iteration (at t=i−1) the centroid $c_{22}$ was 0.5)

$c_{11}$=remains as previously set
for $n_{12} \to c_{12} = x[1] = 10.2$
for $n_{13} \to c_{13} = x[5] = 13.75$
$c_{13}$=remains as previously set and $$\text{for } n_{20} \to c_{20} = \frac{1}{2}[x(2)+x(4)] = \frac{1}{2}[0.5+1.9] = 1.2$$

(note that prior to this iteration (at t=i−1) the centroid $c_{21}$ was 2.5)

$c_{21}$=remains as previously set and $$\text{for } n_{22} \to c_{22} = \frac{1}{2}[x(0)+x(6)] = \frac{1}{2}[10.0+10.4] = 10.2$$

(note that prior to this iteration (at t=i−1) the centroid $c_{22}$ was 10.5)

Figure 5:
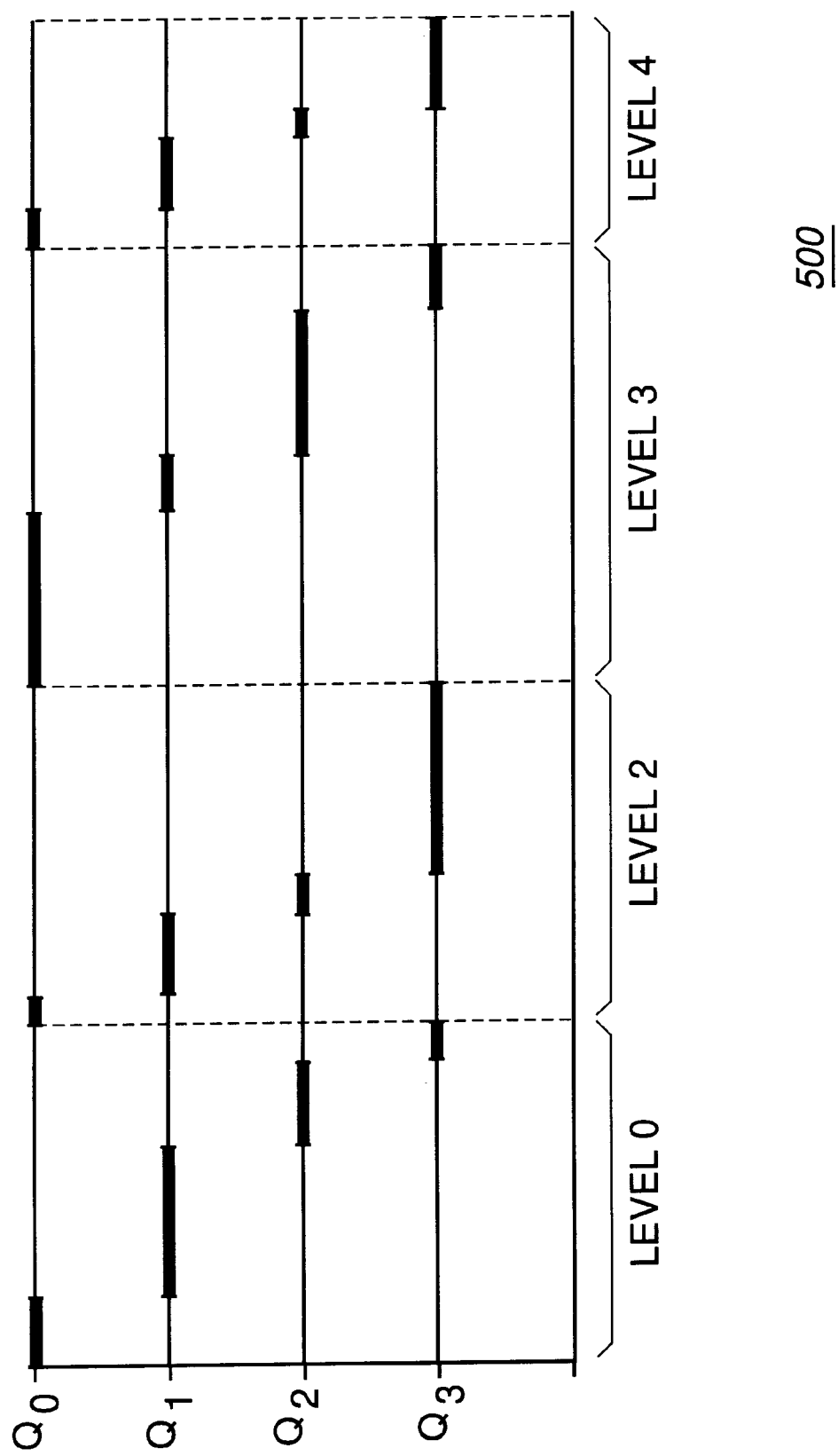
FIG. 5 a graphical representation of an example of the level distribution for each of the four quantizer states going through an arbitrary iteration of the quantizer of FIG. 2 in accordance with the present invention.

$c_{23}$=remains as previously set
$c_{30}$=remains as previously set
$c_{31}$=remains as previously set
$c_{32}$=remains as previously set
$c_{32}$=remains as previously set
$c_{33}$=remains as previously set Thus, where the previous centroids were all centered around 0.5, as shown in the example of FIG. 3, now a new centroid is available for each state and level of quantizer (which is now non-uniform). The same set of data x(n) gets reclassified with the new centroids in the second iteration, and the iteration process is repeated until the error measurement for the given input signal reaches a predetermined desired value. FIG. 5 shows a graph 500 of an arbitrary example of how after one or several adaptive iterations, the various states and levels may change from a uniform distribution to one that may best fit the input data. This method described by the invention guarantees convergence to a lower error at each iteration.

Thus, taking sampled data coefficients x(n) through the steps of trellis quantizing with a least mean square algorithm to form a matrix and calculating updated centroids for each quantization state provides a pruning algorithm which is reiterated until there is suitable convergence to generate a desired SNR. In the case of a new subband or a new set of input data, the quantizer can also be trained to commence the first iteration using centroid values computed from a previous data run. In this way, if similar input data is expected in the next input data range, the quantization can commence with centroid values which are much closer to being optimized and thus fewer iterations will be needed to achieve full optimization of a SNR.

In the case of prior art, the quantization schemes have basically stopped at the Viterbi algorithm stage because it was assumed that the delta between the quantization levels was uniform. By applying applicants quantization scheme 114 as described by the invention, the centroid calculation is dynamically adjusted as the distance between the quantization levels changes (as can be seen by comparing FIGS. 3 and 5). Hence, while the prior art operated on a uniformly spaced system, the quantization scheme of the present invention allows for non uniformity and adaptation based on the input data.

The quantization stage 114 of the present invention adaptively allocates the levels of the quantization states using updated centroids. The quantizers are thus optimized to the data distribution so as to achieve improved SNR. The quantizer outputs 115 get coded at stage 116 and transmitted to channel 130. The quantizers outputs 115 are thus adaptively allocated based on the incoming signal. The adaptive centroid based quantizer described by the invention allows input signals, such as an image signal, to be optimized by adaptively allocating the quantizations base on the input signal. The quantization block 114 can also be trained so that for certain types of signals, such as facial images during teleconferencing, the quantization step will commence at some predetermined state and level allocation to reduce processing time.

The following steps summarize the adaptive centroid based quantization scheme in accordance with the invention:

i) The input data range is divided into a predetermined number of steps. For the example described above there were 16 quantization steps for a 4-bit trellis.

ii) The quantization steps are formed into a matrix of states. In the above example, steps 1, 5, 9, 13 go to state one, steps 2, 6, 10, 14 to state two and so on. This is the initial state assignment.

iii) A shrink factor may be introduced as previously described when the input data is expected to have a predetermined distribution, such as a Laplacian distribution.

$$\{Q_k^i, k=0; K-1\}|_{i=0}$$

iv) Run trellis with LMS algorithm, preferably a Viterbi algorithm.

v) Obtain first raw SNR value or other error measurements by computing mean square error.

$$\sigma_e^2(i+1) = \frac{1}{N}\sum_k\sum_j \|X(\overline{n}_{k,j}) - C_{k,j}^{i+1}\|^2$$

vi) Compute centroid values for the data samples, one centroid for each level, per state.

vii) Obtain a refined higher SNR value by computing a new mean squared error.

viii) Run trellis with LMS algorithm a second time using update centroid values from step (iv).

viv) Recompute centroids, and obtain new values of SNR. The last value of SNR will be better than the first. The SNR increases in diminishing returns at each iteration cycle by centroid updating.

x) Stop iterations when some predetermined SNR criteria is met.

The advantages of the adaptive centroid based quantization scheme described by the invention include faster iteration process time (as compared to gradient methods) as well as convergence.

One optional parameter was introduced in the above steps, a shrink factor. If the input data has a sharp distribution like a zero-mean Laplacian, the outermost levels will see few data samples. Therefore, a shrink factor can be applied concentrating all levels into the more active center of the input range. The resulting SNR increases monotonically at each iteration and converges towards an optimal SNR level. The effect of the shrink factor is to reduce the total number of iterations to attain the optimal SNR value.

Figure 6:
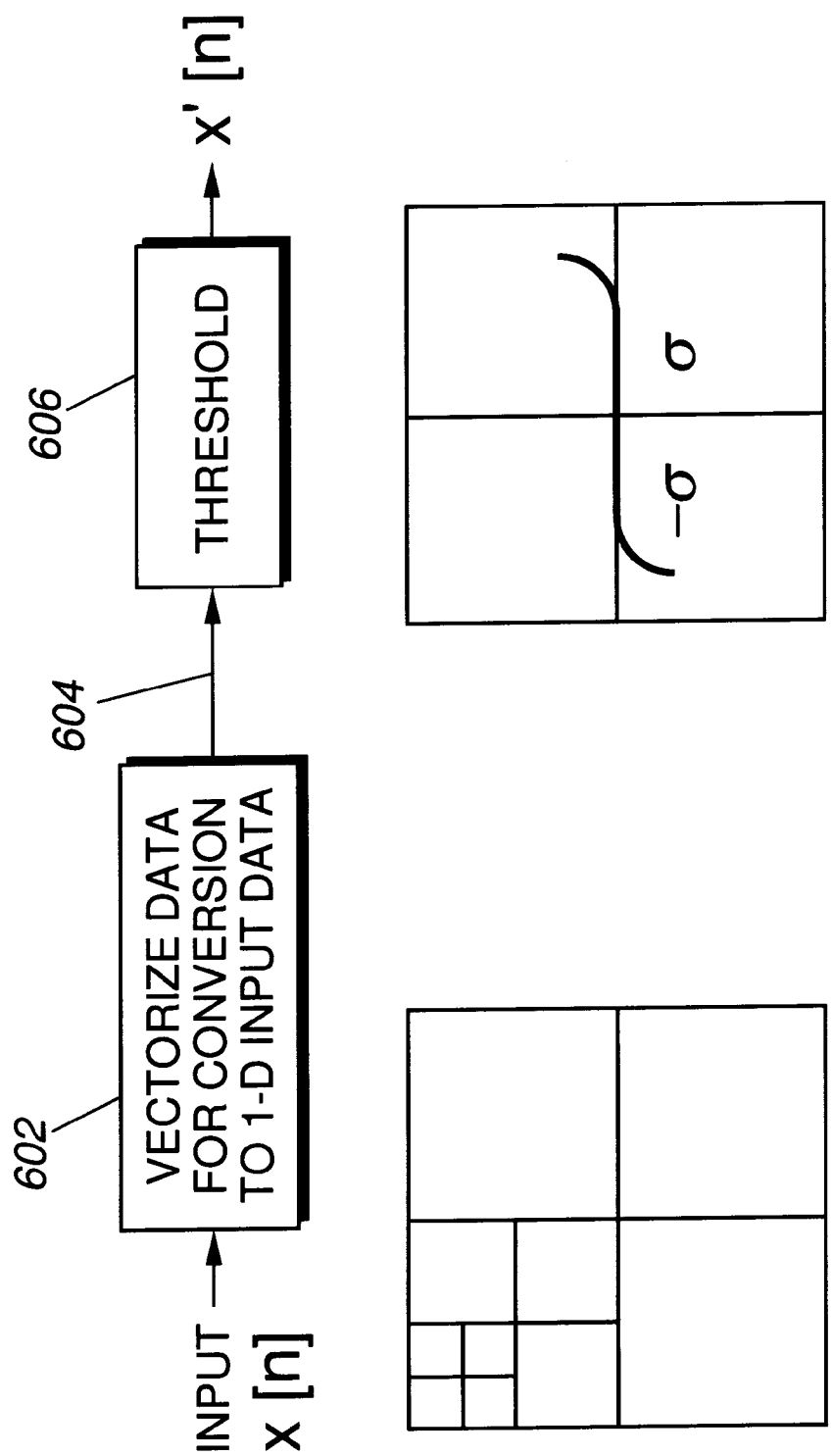
FIG. 6 is a proposed implementation of a one dimensional data stream conversion prior to quantization in accordance with an alternative embodiment of the invention.

The system application described thus far includes a transformation stage, quantization stage, coding, channel, inverse coding, and inverse decomposition stage. In another embodiment of the invention, vectorization (converting 2D to 1D data stream) and threshold stages will be performed prior to quantization 114 so that long strings of repetitive data can be represented by a single code and a non-zero 1D data stream is obtained. FIG. 6 is a proposed implementation in which the data x(n) is vectorized to 1-D at stage 602 to produce vector coefficients 604. These vector coefficients 604 are then compared to a threshold 606 prior quantization. Basically, data samples of zero and/or values close to zero will be discarded by threshold 606 to obtain a modified one-dimensional input data array of non-zero elements as inputs for the adaptive centroid based quantizer 114.

Figure 7:
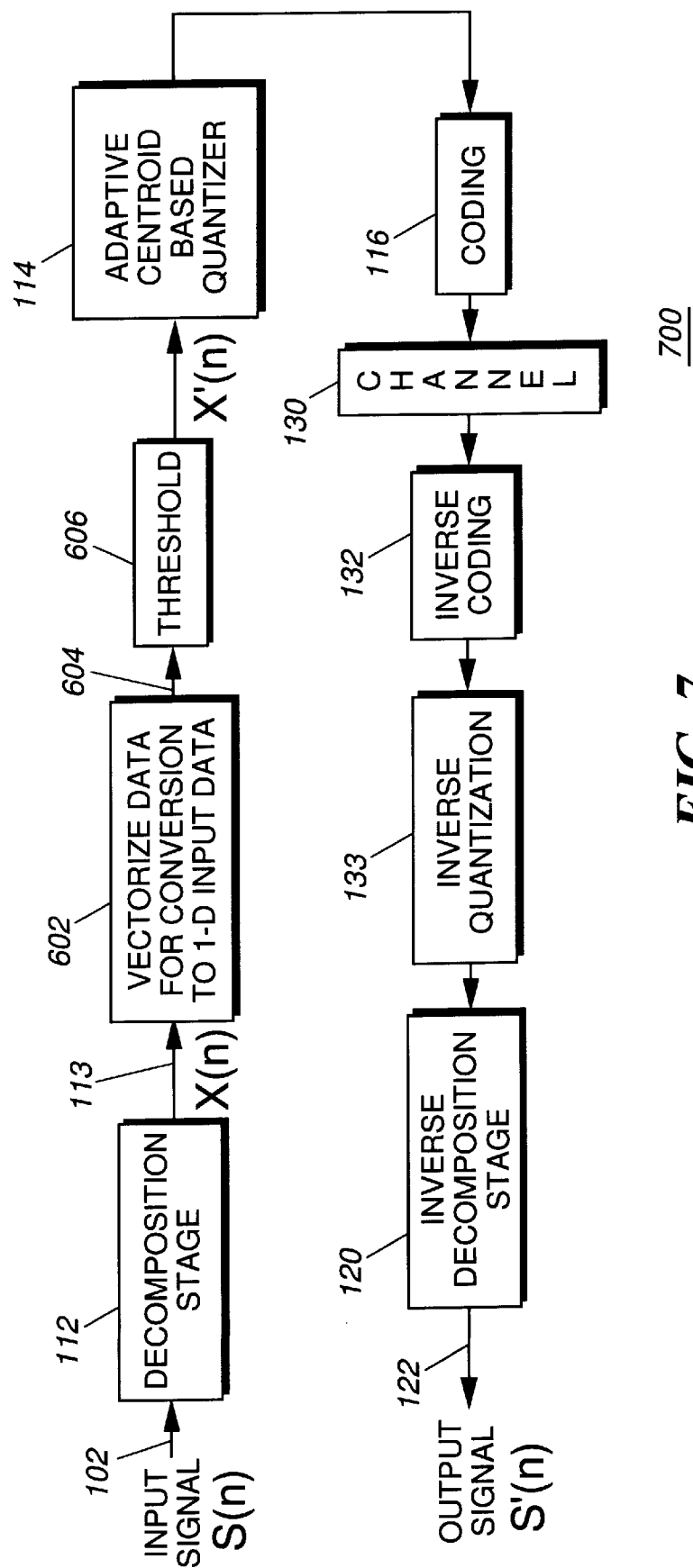
FIG. 7 shows the 1-D data stream conversion step as part of a complete data CODEC system in accordance with the alternative embodiment of the invention.

FIG. 7 shows the 1-D data stream conversion step as part of a complete CODEC system 700. Once quantized there may be repetitive data which is preferably coded at coding stage 116 for further compression. This reduces transmission time and computation time. Again, the advantages achieved through the dynamic centroid based quantization 114 will be achieved with the system 700 embodiment along with the additional benefit of efficient transmissions of repetitive data through coded signals.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of quantizing a data signal in a digital signal processing system, comprising the steps of:

receiving a series of transformed coefficients as the data signal;

performing a minimum error algorithm on the transformed coefficients to determine paths of minimum error;

forming a three-dimensional matrix representing the paths of minimum error;

computing centroids based on the paths of minimum error;

using the computed centroids as part of a next iteration where the computed centroids are used to represent new quantization states and levels;

repeating the steps of performing through using until a predetermined optimization of centroids is met; and transmitting the centroids as the quantized signal.

2. The method of claim 1, wherein the minimum error algorithm is characterized by a trellis least mean square (LMS) algorithm.

3. A method of quantizing a signal, comprising the steps of:

receiving an input data signal having a data range;

dividing the input data range into a predetermined number of quantization steps;

allocating the quantization steps to a number of quantization states and levels;

running the quantized states and levels through an error minimization algorithm;

adaptively computing centroid values from the input data of each quantizer state and level;

updating the quantizer states and levels based on the computed centroids;

repeating the steps of dividing through updating until a predetermined optimization of centroids is achieved; and transmitting the updated centroids as quantizer outputs once the predetermined optimized centroids are achieved.

4. The method of claim 3, wherein the step of running the quantized states and levels through a minimum error algorithm includes the steps of:

storing an index pointing to the quantizer state and level for each input of sampled data; and forming a matrix of the stored index locations for each quantization state and level.

5. The method of claim 3, wherein the minimum error algorithm consists of a least mean square (LMS) algorithm.

6. The method of claim 3, wherein the predetermined optimization of centroids is based on a predetermined error threshold.

7. The method of claim 6, wherein the step of receiving the input data signal includes the step of decimating the input data signal prior to the step of dividing.

8. The method of claim 7, wherein the step of decimating comprises the step of taking every other data sample from the data range.

9. The method of claim 8, further including the step of receiving a full string of input data to run through a final iteration of the steps of receiving through updating.

10. The method of claim 3, wherein a signal-to-noise ratio (SNR) value or change in value is determined based on the computed centroids.

11. The method of claim 10, wherein the optimization of centroids is based on comparing the SNR value to a predetermined threshold; and repeating the steps of re-running the minimum error algorithm, adaptively computing centroid values, updating the states and levels, and obtaining a SNR value until the SNR value or change in value reaches the predetermined threshold.

12. The method of claim 3, where the step dividing comprises the step of uniformly dividing the data range.

13. The method of claim 3, wherein the LMS algorithm is a Viterbi algorithm.

14. The method of claim 3, wherein a shrink factor is applied to the quantization steps.

15. The method of claim 14, wherein the step of dividing further includes the step of decimating the input data signal.

16. A method of quantizing an input data signal in a digital processing system, comprising the steps of:

receiving the data signal;

running a trellis path optimization on the input data signal to generate a history of minimum error paths;

forming a path matrix based on the minimum error paths;

computing a centroid based on the path matrix;

re-running the trellis path optimization to produce non-uniform allocation of quantizer states and levels; and transmitting the computed centroids as quantizer outputs.

17. The method of claim 16, wherein the data signal is a decimated data signal.

18. The method of claim 16, where the trellis path optimization is mirror imaged.

19. A data CODEC system for a digital communication system, comprising:

a decomposition stage for receiving an input data signal and generating a signal of transformed coefficients;

an adaptive centroid based quantizer for receiving the transformed coefficients and generating optimal non-uniform spaced quantizers, wherein the adaptive centroid based quantizer includes a least means square (LMS) stage to generate a matrix of minimum error paths of the quantizers and a centroid computation stage for computing and updating a centroid calculation of the matrix of minimum error path;

a coding stage for coding the quantizers into a coded signal;

a channel for transmitting the coded signal; and a decoder for decoding the transmitted signal.

20. A data CODEC as described in claim 19, wherein the input data signal is first converted into a one dimensional (1-D) data input stream meeting a predetermined threshold in which unwanted or repetitive data is discarded.

21. A data CODEC as described in claim 19, wherein the decoder includes an inverse of the adaptive centroid based quantizer for converting the transmitted signal into a decoded signal.

22. A data CODEC as described in claim 19, wherein non-uniformly spaced quantizers are generated until a predetermined error measurement or bit rate is achieved.

23. The method of claim 1, wherein the optimization of centroids is determined based on a predetermined signal to noise ratio (SNR) threshold.

24. The method of claim 1, wherein the optimization of centroids is based on an entropy threshold.

25. The method of claim 1, wherein the optimization of centroids is based on a bit rate threshold.

26. The method of claim 16, wherein the computed centroids are transmitted to a coding stage.

27. A data CODEC system for a digital communication system, comprising:

a decomposition stage for receiving an input data signal and generating a signal of transformed coefficients;

an adaptive centroid based quantizer having a matrix generation stage and a centroid computation stage for receiving the transformed coefficients and generating optimal non-uniform spaced quantizers;

a coding stage for coding the quantizers into a coded signal;

a channel for transmitting the coded signal; and a decoder for decoding the transmitted signal.

28. A data CODEC as described in claim 27, wherein the input data signal is first converted into a one dimensional (1-D) data input stream meeting a predetermined threshold in which unwanted or repetitive data is discarded.

29. A data CODEC as described in claim 27, wherein the decoder includes an inverse of the adaptive centroid based quantizer for converting the transmitted signal into a decoded signal.

30. A data CODEC as described in claim 27, wherein non-uniformly spaced quantizers are generated until a predetermined error measurement or bit rate is achieved.

31. A data CODEC as described in claim 27, wherein the channel is a wireless channel.

32. A data CODEC as described in claim 27, wherein the channel is a wireline channel.

33. A data CODEC as described in claim 27, wherein the channel is a optically linked path.

34. A data CODEC as described in claim 27, wherein the channel is an acoustic path.

35. A data CODEC as described in claim 27, wherein the channel is a fiber optic transmission path.

36. A data CODEC as described in claim 27, wherein the channel is a radio frequency (RF) channel.

* * * * *